Oct. 15, 1957     A. D. MANKER     2,809,759
FORK LIFT TOW BRACKET
Filed May 8, 1956
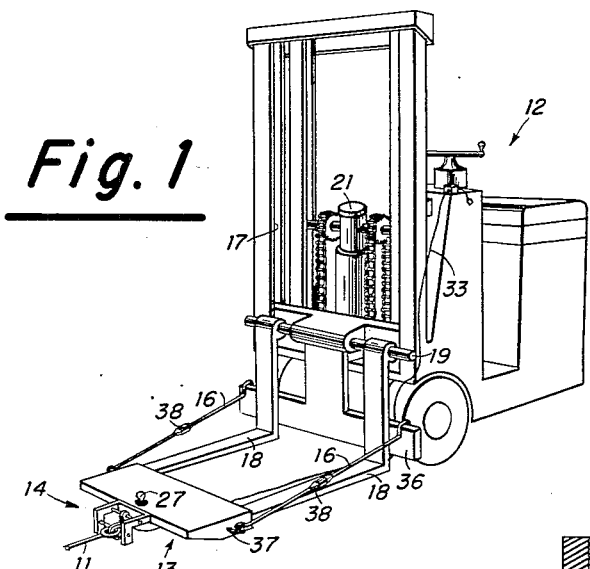
Fig. 1
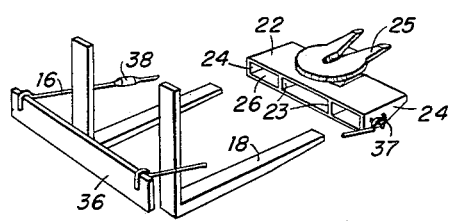
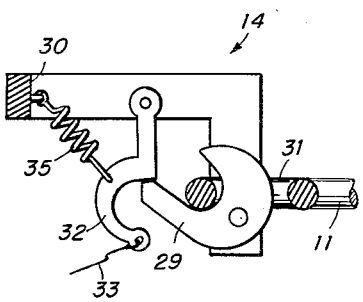
Fig. 2
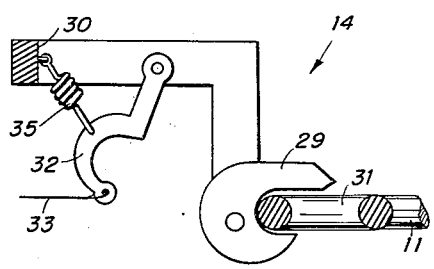
Fig. 3
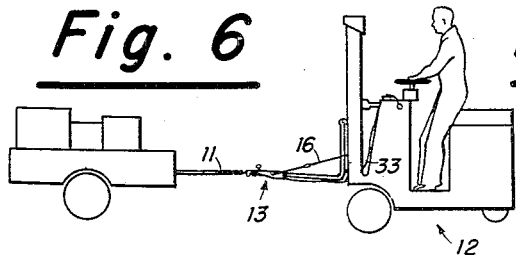
Fig. 4
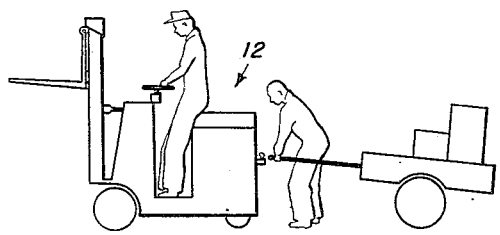
Fig. 6     Fig. 5
INVENTOR.
ALFORD D. MANKER
BY
Robert O. Richardson
ATTORNEY

United States Patent Office
2,809,759
Patented Oct. 15, 1957

2,809,759

FORK LIFT TOW BRACKET

Alford D. Manker, Palm City, Calif.

Application May 8, 1956, Serial No. 583,509

7 Claims. (Cl. 214—620)

This invention relates to a fork lift truck bracket and more particularly to a bracket mountable on the forks of a fork lift truck and having a trailer hitch thereon for maneuvering trailers about with a fork lift truck.

Trailers loaded with field experimental equipment or merchandise waiting to be unloaded or stored must be moved about from time to time. This has been done heretofore with a tow truck. Two wheel trailers are always loaded with the center of gravity forward of the axle, shifting great weight onto the towing bar. Usually a group of men were required to raise the trailer tongue while the truck was backed until the trailer hitch could be connected to the trailer tongue. The truck driver had to exercise great skill in backing the truck into position for hitching the trailer thereto. The truck with a trailer connected at the rear thereof needs maneuvering room and is operable with difficulty in crowded spaces. Semi-trailers were maneuvered with semi-trailer tractors upon which was mounted the well-known "fifth" wheel. This had a further disadvantage in that the tractor was unavailable for other services when used in this capacity.

With the bracket comprising the present invention, a tiering or fork lift truck, normally used in loading and storage areas and therefore readily accessible, may be used for maneuvering loaded trailers. This is a highly desirable method in that only the truck operator is needed to effect the hitching operation and he may do this from his driver's seat without danger of accident or muscular strain. The fork lift truck is easily maneuverable into position and, with the bracket attached to the lift forks, the connection is made in easy view of the operator. Moreover, the trailer is easily maneuverable in crowded areas when coupled to the forks of a lift truck. The bracket is easily attached without modification of the forks and after use may be quickly detached, rendering the truck available for other service.

It is therefore an object of this invention to provide for a hitching and towing bracket for the forks of a fork lift truck.

A further object is the provision of a fork lift bracket which may be easily and quickly installed and removed without modification of the fork lift apparatus.

Another object is the provision of a fork lift bracket attached to the fork lift apparatus in such a manner that a trailer attached thereto may be easily maneuvered in restricted areas.

Another object is the provision of a fork lift bracket which enables a trailer to be connected thereto with a minimum of effort and danger to the fork lift operator.

Still another object is the provision of a fork lift bracket simple in design, economical in fabrication, yet rugged and dependable in service.

Other objects will become apparent as the description of the invention proceeds with reference to the drawings wherein:

Fig. 1 is a perspective view showing the towing bracket attached to a fork lift truck with a trailer tongue connected thereto;

Fig. 2 shows the bracket in cross-section with the tongue connected;

Fig. 3 shows a cross-sectional view just prior to attachment of the tongue;

Fig. 4 is an exploded view of the parts with a fifth wheel mounted on the bracket;

Fig. 5 shows the old way of connecting a trailer to the truck; and

Fig. 6 shows how the trailer is connected and maneuvered using the present invention.

Referring to the drawings wherein like numerals designate like parts throughout the several views, the connection of the trailer tongue 11 to the fork lift truck 12 through the bracket 13, tow hitch 14, and retaining stays or ties 16 are best shown in Fig. 1. Most conventional fork lifts are hydraulically movable in a vertical direction in a guide frame 17. The forks 18 are pivotally mounted at their top to pivot bar 19 connected to the hydraulic lift mechanism 21. Bracket 13 includes a horizontal flat top plate 22 extending laterally across the top of the fork tips. Referring to Fig. 4, partitions 23, 24 extend downwardly from plate 22 and are spaced to fit on either side of the forks 18. Partitions 23 maintain the forks in spaced relation. Below the partitions and secured thereto is a second flat plate 26 extending laterally between the forks. The partitions 23, 24, connecting plates 22, 26 make a solid unitary rigid structure capable of supporting great weight. As seen in Fig. 4, the two plates 22, 26 are relatively spaced to fit the taper of the fork tips. Extending through aligned apertures in plates 22, 26 in Fig. 1 is a shaft supporting a ball 27 thereon for making a ball and socket connection with trailers having that type of connection. In Fig. 4 a fifth wheel 25 is mounted on bracket 13 for moving semi-trailers. An automatic lock and release mechanism is mounted on the front surface 30 of the bracket in Fig. 2 and Fig. 3. This mechanism comprises a rotatable connecting member 29 which engages the eye 31 of the trailer tongue 11 and a releasable retaining member 32 spring urged forwardly by spring 35. As shown in the exploded view in Fig. 4 and in the perspective view in Fig. 1, the bracket 13 is secured over the fork tips by means of ties 16 which hook over the elevating back support or carriage 36 of the truck lift mechanism 21 which supports the forks 18 and hooks through an eye 37 on either side of the bracket. Turnbuckles 38 make the ties adjustable to fit forks of varying length and to tighten the fit of the bracket on the forks. Since the ties 18 must withstand a tensile or pulling force, flexible ties such as cables may be preferred. It should be noted that with the ties connecting the bracket to the back support 36, the forks are no longer capable of pivoting action, enabling the truck to tow the trailer either forward or backward.

In operation the operator drives the fork lift truck forward to the trailer tongue, raises or lowers the forks containing the bracket until they are level with the tongue, then moves the truck forward slowly until the connecting member 29 engages eye 31 and is rotated counterclockwise as shown in Fig. 3. When the connecting member 29 is rotated fully rearward, it is locked in position by retaining member 32 pivotally connected to the bracket. The operator then raises or lowers the trailer tongue 11 as desired by raising or lowering the forks 18 and then pushes or pulls the trailer to the desired new location. When the trailer is positioned, the operator pulls the cable 33, urging retaining member 32 from the path of rotation of connecting member 29. As the truck is moved slowly rearwardly the retaining member 32 rotates forwardly, freeing the trailer from the fork lift truck.

From the above description, it is seen that a fork lift truck operator facing forward at his seat on the truck can perform all operations quickly by himself without physical effort or danger using any of the connecting mechanisms described. The bracket is easily attached or removed from the forks by one person. No modification of the truck is necessary nor is normal use of the truck in any way hindered.

It is evident that various modifications can be made to the preferred embodiment herein disclosed without departing from the spirit of this invention and all such modifications are to be regarded as lying within the scope of the appended claims.

What is claimed is:

1. In combination with a fork lift truck having fork members pivotally connected to a vertically movable carriage and movable therewith for maintaining said fork members in extended position, means for attaching a trailer to said fork members comprising a bracket fitted over said fork members, trailer connecting means attached to said bracket, and bracket connecting means connecting said bracket to said carriage thereby securing said bracket over said fork members and preventing pivotal action of said fork members due to trailer drag when said truck is moving rearwardly.

2. In a fork lift tow bracket as in claim 1, said bracket comprising a top cross member and a bottom cross member, said members spaced to permit insertion of the tips of said fork members therebetween, said members secured in spaced relation by partitions spaced to fit along the sides of said fork members to maintain said bracket in fitting engagement with said fork members and maintain said fork members in spaced relation, means on bracket for receiving one end of said bracket connecting means, front surface means connecting the front edges of said partitions and top and bottom cross members, an automatic lock-release mechanism mounted on said front surface for engaging said trailer tongue, and cable means for operating the release on said lock-release mechanism, said cable means extending from said release to within reach of the operator seated on said truck.

3. In a fork lift tow bracket as in claim 1, said bracket comprising an upper and lower cross member spaced apart to permit insertion of said fork tips therebetween, said trailer connecting means comprising a semi-trailer fifth wheel attached to said upper cross member, partitions connected to said cross members in spaced relation, and receiving means on said bracket for receiving said bracket connecting means.

4. In combination with a fork lift having two vertically movable fork members and an elevating back support, a fork lift bracket and connecting means therefor, said bracket having a top portion extending laterally across the tips of said fork members, a bottom portion extending under said tips and spaced from said top portion an amount to permit insertion of said tips therebetween, vertical partitions spaced adjacent the sides of said tips connecting said top and bottom portions, an automatic lock-release mechanism attached to the front of said bracket, cable means connected to said release mechanism and extending to within reach of the truck operator, at his seat, connecting means for securing said bracket over said tips comprising tie means extending through eyes on either side of said bracket to said elevating back support on said truck, said tie means including turnbuckles turnable for adjusting the length of said ties to accommodate forks of various lengths.

5. Means adapting a fork lift truck having a vertically movable carriage with forks pivotally mounted on the carriage for maneuvering a semi-trailer comprising a bracket mounted on the forks of said truck, a fifth wheel mounted on said bracket, and means connecting said bracket to said carriage to secure said bracket on said forks and to prevent pivotal action of said forks when said bracket is mounted thereon.

6. In combination with a fork lift truck having fork members pivotally connected to a vertically movable lift frame having an elevating back support movable therewith for maintaining said fork members in extended position, means for attaching a trailer to said fork members comprising a bracket fitted over said fork members, trailer connecting means attached to said bracket, and bracket connecting means connecting said bracket to said back support thereby securing said bracket over said fork members and preventing pivotal action of said fork members due to trailer drag when said truck is moving rearwardly, said bracket connecting means comprising two elongated tie members connected to a turnbuckle, said receiving means connecting one end of one tie member to said bracket, one end of the other of said tie members adapted for connection to said elevating back support on said lift truck.

7. In combination with a fork lift truck having fork members pivotally connected to a vertically movable lift frame having an elevating back support maintaining said fork members in extended position, means for attaching a trailer to said fork members comprising a bracket having an upper and lower cross member spaced apart to permit insertion of said fork members therebetween, a semi-trailer fifth wheel attached to said upper cross member, bracket connecting means connecting said bracket to said back support thereby securing said bracket over the tips of said fork members and preventing pivotal action of said fork members when said truck is moving rearwardly, said bracket connecting means comprising two elongated tie members connected to a turnbuckle, said receiving means connecting one end of one tie member to said bracket, one end of the other of said tie members adapted for connection to said elevating back support on said lift truck.

References Cited in the file of this patent

UNITED STATES PATENTS

| 1,755,164 | Bentley | Apr. 22, 1930 |
| 1,816,206 | Booth | July 28, 1931 |
| 2,120,042 | Remde | June 7, 1938 |
| 2,490,772 | Benner | Dec. 13, 1949 |
| 2,646,288 | Grigsby | July 21, 1953 |
| 2,714,463 | Frasar | Aug. 2, 1955 |
| 2,761,522 | Paradiso et al. | Sept. 4, 1956 |